United States Patent [19]
Howe et al.

[11] Patent Number: 5,127,876
[45] Date of Patent: Jul. 7, 1992

[54] FLUID CONTROL VALVE UNIT

[75] Inventors: Samuel H. Howe, Carson City, Nev.; Richard R. Walker, Urbana, Ohio

[73] Assignee: Bruce Industries, Dayton, Nev.

[21] Appl. No.: 721,824

[22] Filed: Jun. 26, 1991

[51] Int. Cl.⁵ .............................................. B60H 1/34
[52] U.S. Cl. ..................................... 454/76; 454/286; 454/323; 251/263
[58] Field of Search ............... 454/76, 154, 286, 323, 454/334; 251/253, 263

[56] References Cited

U.S. PATENT DOCUMENTS

| | | | |
|---|---|---|---|
| 335,673 | 2/1886 | Bacon | 454/286 X |
| 2,074,240 | 3/1937 | Saunders | 251/263 X |
| 2,516,805 | 7/1950 | Rother et al. | 454/76 |
| 2,524,974 | 10/1950 | Hickmott | 454/286 |
| 2,830,523 | 4/1958 | Vehige | 454/286 X |
| 3,113,502 | 12/1963 | Kallel et al. | 454/76 X |
| 3,542,492 | 11/1970 | Muella | 454/76 X |
| 4,716,818 | 1/1988 | Brown | 454/286 |

FOREIGN PATENT DOCUMENTS

| | | | |
|---|---|---|---|
| 987035 | 8/1951 | France | 454/286 |
| 524341 | 4/1955 | Italy | 251/263 |
| 715096 | 9/1954 | United Kingdom | 454/323 |

*Primary Examiner*—Harold Joyce
*Attorney, Agent, or Firm*—Beehler & Pavitt

[57] ABSTRACT

An air control valve unit which includes an axially moveable and non-rotating closure member which is responsive to the rotative and non-axial movement of an actuator. The rotative movement of the actuator moves the closure member between a closed position which creates an airtight seal between the closure member and a plurality of open positions each allowing progressive amounts of air to flow from an air source through the valve unit member in fluid communication with the closure member. The closure member and actuator are supported in a cavity of the housing member.

20 Claims, 4 Drawing Sheets

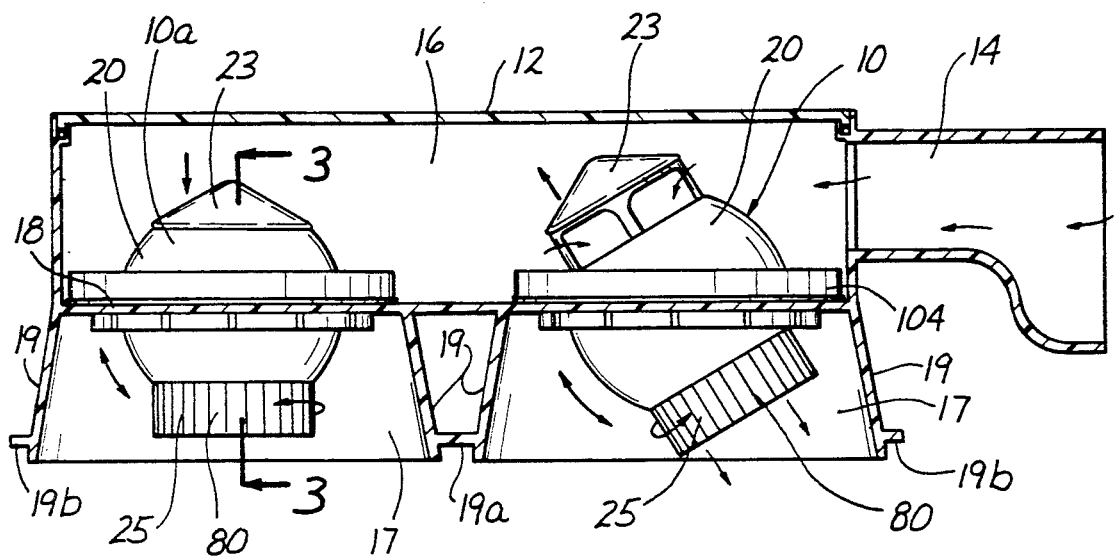
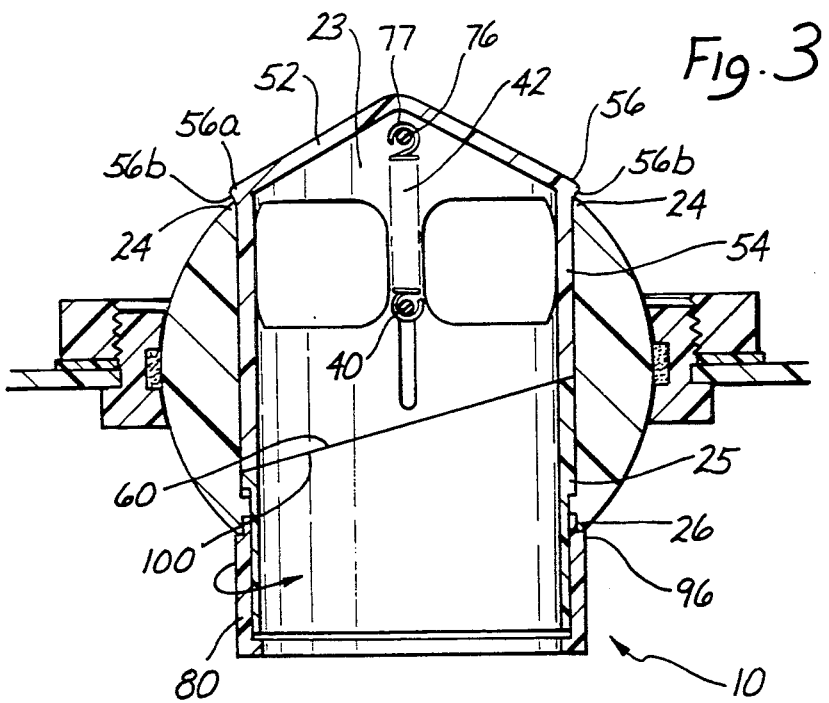

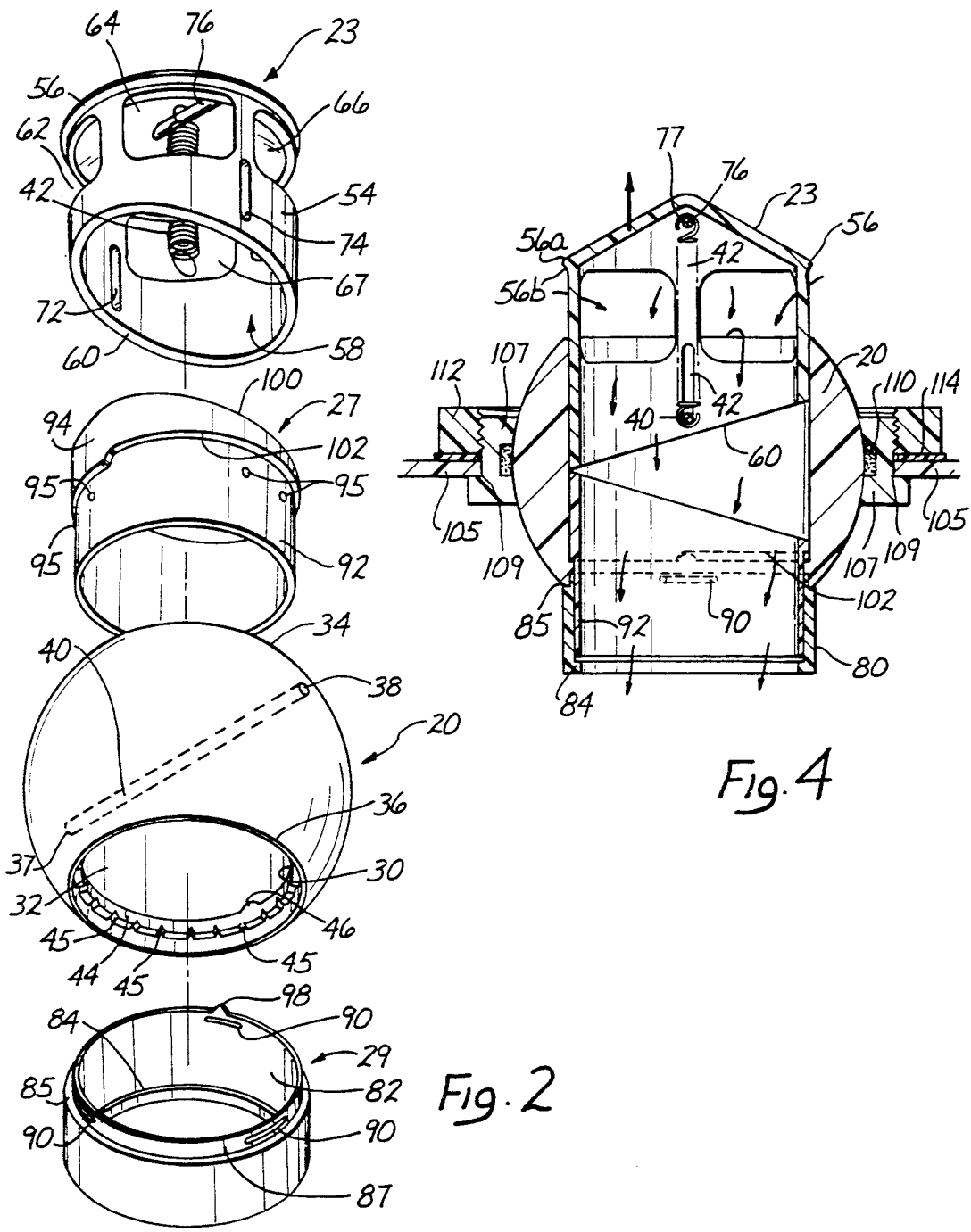

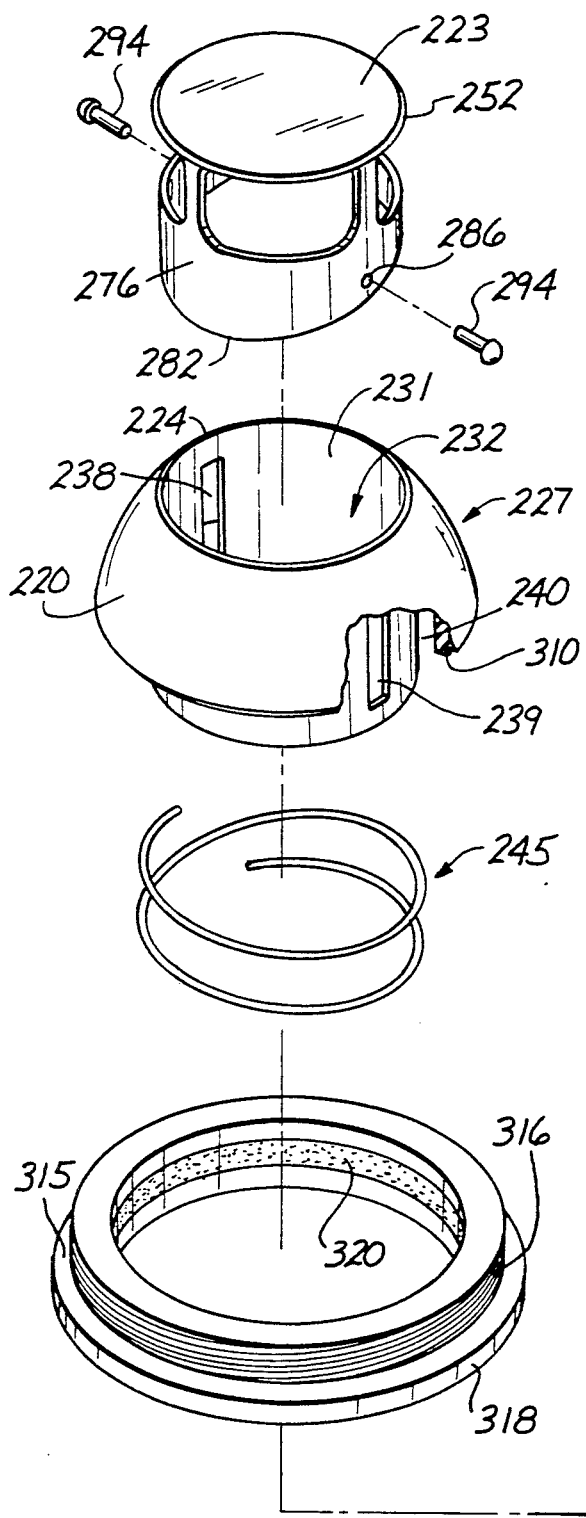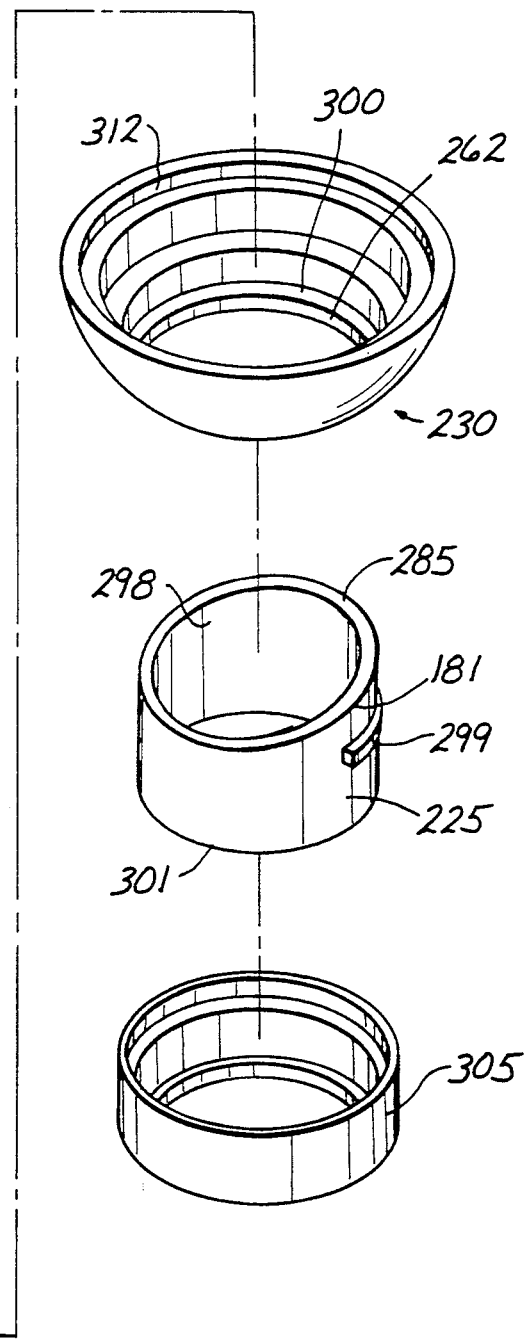

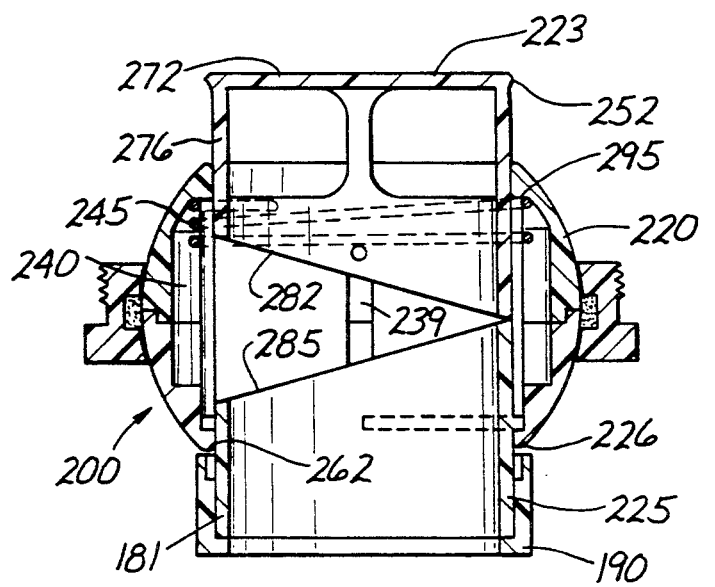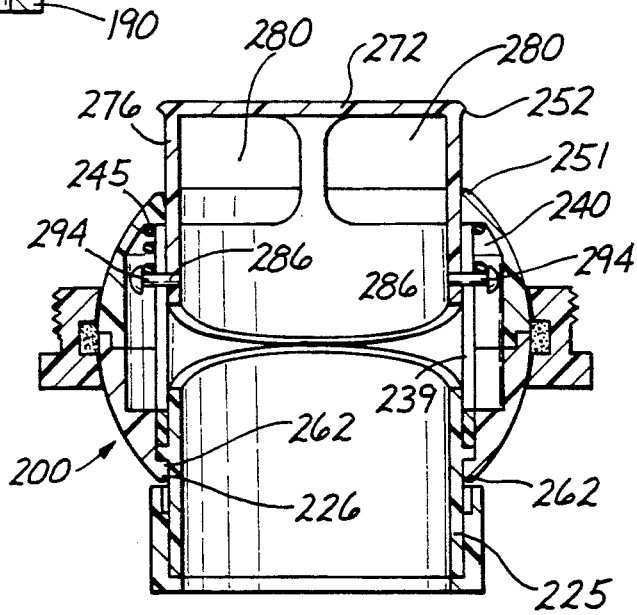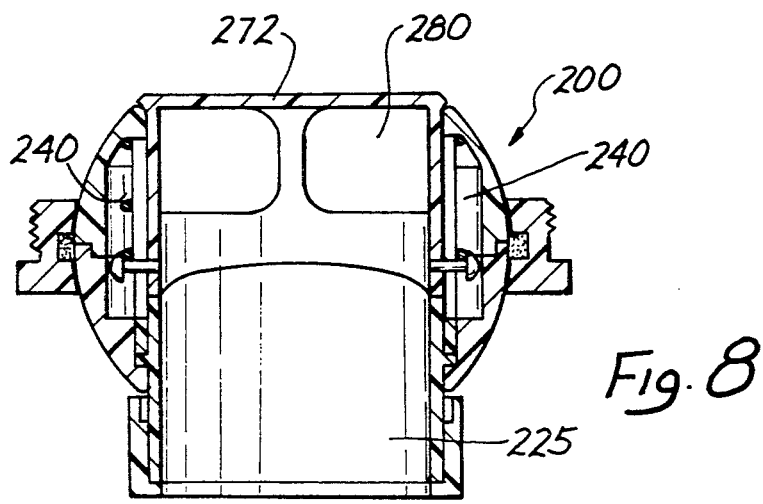

5,127,876

FLUID CONTROL VALVE UNIT

FIELD OF INVENTION

This invention relates generally to fluid control valves and more specifically to an improved air control valve preferably used, but not limited to use as a part of a passenger service unit for aircraft, buses, trains, and the like, wherein the discharge rate and direction of air discharge may be controlled manually.

BACKGROUND OF THE INVENTION

A passenger service unit (PSU) is a unit that is typically located overhead of each passenger in an aircraft, bus, or train, the PSU normally including lighting, call button and an air control valve. The air control valve normally consists of a valve device which controls the rate and direction of air flow into the passenger cabin and in the region of the passenger for providing essentially personal control and direction of air. These air control valves are well known in the art and normally include a universally pivotable ball type assembly for controlling the amount and directing the flow of air through the valve in the direction set by the passenger, or other person in the case of a control valve used other than in a PSU.

THE PRIOR ART

Air control valves themselves are well known, see for example, U.S. Pat. No. 4,716,818 to Brown; U.S. Pat. No. 2,596,909 to Mufich et al; U.S. Pat. No. 2,462,989 to Mufich et al; U.S. Pat. No. 3,690,244 to Kallel et al; U.S. Pat. No. 3,835,759 to Lloyd; U.S. Pat. No. 2,885,943 to Divizia; U.S. Pat. No. 3,113,502 to Kallel et al; and U.S. Pat. No. 2,189,502 to Johnston; and U.S. Pat. No. 2,974,580 to Zimmerman et al; and U.S. Pat. No. 4,524,679 to Lyons; and U.S. Pat. No. 3,366,363 to Hogan et al.

Most of the prior expedients provide a rotatable adjustable knob in the passenger's cabin for adjusting the degree of air flow through the valve.

One of the problems which has not been solved by these prior expedients is air leakage when the system is supposedly closed. Air leakage tends to cause a whistling noise and results in unwanted cold air tending to come down on the passenger.

A second problem of these prior expedients is restricted air flow when the device is supposedly completely open. It is important to have a wide range of flow from completely closed to completely open, to provide the passenger with the highest degree of comfort and choice.

Another problem with the prior expedients is degradation of the device over time due to complexity and the like.

Another problem is cost of assembly due to the need, with some of the prior art devices, to assemble flapper valves and the like.

An ideal air control valve unit would provide an easy rotating adjustment for the passenger, a wide range of air flow to choose from, a closed position which provides a positive seal with no leakage, and component parts which do not degrade over time. Equally important is the ease of manufacture and assembly.

SUMMARY OF THE INVENTION

This invention relates to an air control valve and more particularly to an air control valve unit for variably controlling the discharge of air from an air course which comprises a housing having a cavity extending therethrough, a rotatably and non-axially movable actuator supported in a one end of the cavity of the housing, and a closure member adapted to move axially and non-rotatably like a poppet valve in and out of the other end of the cavity of the housing in response to the rotation of the actuator.

The housing is preferably in the general shape of a sphere. The housing is thereby of the type which can be universally pivotable when mounted in a wall of an air manifold. The housing can be a single part or it may be two or more parts to provide easy assembly.

The cavity is preferably a cylindrical bore which extends axially through the housing. The closure member is preferably a poppet-type valve in the shape of a tubular sidewall with a cap portion formed on one end. The tubular sidewall has at least one aperture or air window through which air can flow from the high pressure end of the housing through to the low pressure end of the housing. The outer diameter of the tubular sidewall is slightly smaller than the inner diameter of the cylindrical cavity whereby the closure member is adapted to closely fit within and be axially moveable within the cylindrical cavity.

The tubular closure member includes sealing means for engagement with the housing to prevent flow of air therethrough. The sealing means are preferably integral with the cap portion of the closure member. This cap portion may be any shape, but is preferably either flat or conical. The cap extends radially outward beyond the circumference of the side wall defining a flange which is adapted to rest upon, and create an air-tight seal with the high pressure end of the housing. When the closure member is moved axially such that the air-tight seal is created between the flange and the housing, the closure member is in its closed position. As the closure member is moved axially from its closed position away from the housing, more of the air window(s) is exposed and, a correspondingly greater amount of air is allowed to flow therethrough.

The end of the closure member opposite the integrally formed cap includes actuation means for effecting axial movement thereof. The actuation means are preferably in the form of a cam surface. The shape of this second end of the closure member provides a portion of the means by which the closure member is moved axially in response to rotating movement of the actuator member. This second end acts as a cam in cooperation with a similarly cam shaped end of the actuator member. With the mating cam surfaces in aligned engagement, the valve is closed. As the actuator control member is rotated, the cam surfaces are increasingly misaligned to effect axial movement of the closure member from the closed to an open position. The extent of rotation of the control member controls the extent of axial movement of the closure member and thus the air flow.

Means are provided to prevent the closure member from being rotated about its own axis within the cylindrical cavity. A first preferred means for preventing the rotation of the closure member comprises extension elements, for example, pins, being fixed to the tubular side wall and extending outwardly therefrom. Receiving means or pin slots are similarly spaced apart on the inside wall of the cylindrical bore. The pin slots have a circumferential width sufficient to snugly hold the pins therein. The pin slots have a longitudinal length parallel to the longitudinal axis of the cylindrical bore which is of sufficient length to clear the pins and therefore allow the closure member to ride axially within the cylindrical bore. The circumferential width of the pin slots restricts the rotating movement of the closure member.

A second preferred means of preventing the rotation of the closure member while still allowing the axial movement comprises the extension element, or pins, being fixed to the housing along a diameter of the cylindrical bore. The previously described receiving means, or pin slots, are present on the tubular side wall of this embodiment allowing similar axial movement of the closure member while preventing rotating movement by contact of the pin or pins within the pin slots.

The actuator or control member may comprise one or more parts for ease of assembly. In one embodiment, the actuator comprises an inner portion which resides totally within the cavity of the housing, and an outer adjustment collar portion which resides outside the cylindrical bore at the low pressure end of the housing.

The outer adjustment portion of the closure member is fixed to the inner portion of the control member preferably after they are placed in their proper position.

Axial movement of the control member out of the cylindrical bore is prohibited preferably by one or a combination of an outwardly directed radial flange fixed to the outer circumference of the inner portion and/or an inwardly directed radial flange fixed to the inside wall of the cylindrical bore. Contact between these two flanges prevents the inner portion of the control member from moving out of the cylindrical bore.

When a user of the control valve unit rotates the control actuator, the cam end of the control member slides along the cam end of the closure member. When both cam ends are in parallel planes and in complete contact with one another the closure member is in its closed position. As the control member is rotated the closure member is moved axially out of the high pressure end of the housing responsive to the communication between the two cam ends.

The closure member will return to its closed position when the control member is turned a full 360 degrees. Alternatively, the control member can be restricted in its movement to 180 degrees thereby allowing a full range of movement of the closure member while restricting the degree of movement of the control member.

The closure member is preferably biased into its closed position. The means by which the closure member is biased in its closed position is preferably by fixing the top portion of a flexible and resilient element, or spring, with respect to the housing and fixing the bottom portion of the spring to the closure member. One means of accomplishing this is to fix a support, or a hook, to the housing preferably along the longitudinal axis of the cylindrical cavity, and a second support to the closure member also preferably along the longitudinal axis of the cylindrical cavity. The spring is then fixed at either end to both hooks, the spring being in its relatively most relaxed state when the closure member is in its closed position.

A second means of accomplishing the closure biasing of the closure member is to provide an annular chamber within the housing surrounding the cylindrical bore. A spring is placed within the annular chamber. Outwardly extending extension elements, or pins, are fixed to the closure member and extend into the chamber maintaining the spring within the chamber between the pins and the high pressure area of the housing. The spring is in a slightly compressed state when the pins are most distant from the high pressure area and the spring is in relatively greater compressed states when the pins are moved relatively closer to the high pressure area whereby the closure member is biased in the closed position by the action of the spring forcing the pins away from the high pressure area.

The air control valve unit further preferably includes temporary locking means for locking the control member into its corresponding closed and open positions. This temporary locking means preferably comprise an annular ring fixed to the housing in the cylindrical bore. The annular ring preferably has a lower edge containing a plurality of grooves. A projection fixed to the outer collar portion is adapted to fit in each of the grooves and the projection is adapted to a line with each of the grooves upon rotation of the outer adjustment portion.

While the specification concludes with the claims particularly pointing out and distinctly claiming the subject matter which is regarded as the invention, it is believed that the invention, the objects and features of the invention, and further objects features and advantages thereof will be better understood from the following description taken in connection with the accompanying drawings.

BRIEF DESCRIPTION OF THE DRAWINGS

FIG. 1 is a view partly in section and partly in elevation of two adjacent air control units in a passenger service unit in accordance with this invention;

FIG. 2 is an exploded view of one form of an air control valve unit in accordance with this invention;

FIG. 3 is a cross sectional view, taken along the line 3—3 of FIG. 1, of an air control valve of the present invention in the closed position:

FIG. 4 is a cross sectional view similar to FIG. 3 illustrating the open position of an air control valve in accordance with the present invention;

FIG. 5 is an exploded view of another form of an air control valve in accordance with this invention;

FIG. 6 is a cross sectional view of the air control valve of FIG. 5 shown in its opened position;

FIG. 7 is a different cross sectional view of the air control valve unit of FIG. 6 shown in its opened position; and FIG. 8 is a view similar to FIG. 7 illustrating the closed position of an air control valve in accordance with this invention.

DETAILED DESCRIPTION OF PREFERRED EMBODIMENT

Referring to the drawings which illustrate preferred forms of the present invention, two air control valve units 10 and 10a are shown in FIG. 1 mounted adjacent one another in an air supply manifold assembly 12. For purposes of explanation, one valve 10 is illustrated in the full open position and angularly oriented, while the other, 10a, is illustrated in the fully closed position and aligned in a generally vertical orientation, i.e., not angularly pivoted. While the control valves are illustrated adjacent to each other, they may be spaced from each other by devices such as lights or control buttons therebetween, or may be located in a separate air supply manifold.

In the form illustrated, the manifold assembly 12 receives air, usually cooled air from a cooled air source, and has an inlet 14 for providing a continuous flow of air into a sealed inlet air chamber in the manifold 12. The term sealed is used in the context that manifold air cannot exit the manifold except through the valves 10 and 10a. Generally, the pressure of the air in the manifold is slightly higher than the air pressure on the discharge side. The manifold 12 and the individual air control valve units 10 and 10a separate an incoming air flow area 16 from the discharge area 17 which is basically the output side of the individual air control valves. The manifold 12 can be adapted to support any number of air control valve units 10 and 10a, and may be located in a PSU that houses the electronic components and other equipment to provide lighting, a call button, or other passenger conveniences. The manifold 12 can be designed in any shape or manufactured of any material which is comparable to those currently being used to accommodate such passenger conveniences.

As shown, the valves 10 and 10a are mounted and sealed in a lower wall section 18 of the manifold assembly, the latter preferably including depending side walls 19 which form both separators and deflectors for the air discharged by the air control valves. For mounting in aircraft and the like, connecting side walls 19a and side wall elements 19b are optionally provided.

Each air control valve unit 10 and 10a is comprised basically of a housing 20, a closure member 23, and a control member 25, as shown in FIG. 1. The control member functions as an actuator as will be described. Since the valves 10 and 10a are of the same basic structure, further description will be made with respect to valve 10. One form of the air control valve unit 10 in accordance with this invention is illustrated in detail in FIGS. 2–4, in which the control member 25 is depicted as two separate elements 27 and 29, see the exploded view of FIG. 2. Another form of an air control valve unit in accordance with this invention is shown in detail in FIGS. 5–7.

As shown in FIG. 1, the housing 20 is preferably generally spherical and universally pivotable. Such pivotable and generally spherical housings are common in air control valves in the passenger service units in most aircraft as they provide the user with a means by which the air flow can be directed in various directions as the user desires.

Turning now to the embodiment shown in FIGS. 2–4, the housing 20 contains an inside wall 30 which provides a cylindrical cavity or bore 32 extending longitudinally from an air input side 34 to an air discharge side 36. The bore 32 is preferably located on the center axis of the spherical housing 20 to provide equal pivoting movement in all directions. The housing 20 is mounted in a manifold 12, as shown in FIG. 6 such that the higher pressure or inlet end 34 is located in the higher pressure area and the lower pressure or discharge end 36 is situated in the lower pressure area 17.

Two small apertures 37 and 38 are provided in diametrically opposed locations on through wall 30 of the housing 20. These apertures 37 and 38 provide a means by which a lower pin 40 can be fixed along the inner diameter of the cylindrical bore 32. The lower pin 40 is used as an anchor or hook support for a spring 42, as will be discussed below.

An annular ring 44 is fixed, or preferably integrally formed, to the inside of the cylindrical bore 32 near the low pressure end 36 of housing 20. This annular ring 44 projects radially inward and provides temporary locking means as will be discussed below. The annular ring contains a plurality of grooves or notches 45 circumferentially spaced apart on its lowest or outer facing edge. The annular ring 44 further contains a nubbin 46 along the upper edge, whose function is discussed below.

The closure member 23 is basically a poppet valve comprising a dome shaped cap 52 which is preferably integrally formed with a tubular side wall 54. The lower circumferential portion of the cap 52 includes a radially extending peripheral flange 56 whose function is to provide a positive air tight seal with the high pressure end 34 of the housing 20 when the closure member 23 is in a closed position, as indicated in FIG. 1, valve 10a. To this end, the peripheral flange 56 includes a radially extending lip 56a, see FIGS. 3 and 4, which overlies the circular open end of the housing, there being provided a diverging tapered wall 56b between the outside surface of the closure member and the lip 56a. This wall 56b assists in providing an effective seal between the closure member and the housing in the closed position.

The outer diameter of the tubular side wall 54 and the inside diameter of the cylindrical bore or cavity 32 are proportioned to provide a close fit by which the tubular side wall 54 can be fit into the cylindrical cavity 32 and be axially movable therein. In addition to forming a cap-type seal, the flange 56 prevents the closure member 23 from sliding all the way through the cylindrical bore or cavity 32. The tubular side wall 54 defines a longitudinal bore 58 which is aligned with the cylindrical bore or cavity 22 and, when the closure member 23 is in its closed position, there is no air flow through the bore 58.

As previously described, the lower end of the closure member includes an annular cam surface 60 at the bottom end of the tubular side wall 54 and is contoured and lies in a plane which is inclined relative to the side wall 54. The contoured inclined cam end 60 acts as a cam surface to provide the means by which closure member 23 is moved axially by the rotating movement of the control member 25, as will be discussed below.

Tubular side wall 54 further has a plurality of circumferentially spaced apart and axially extending air openings or windows 62, 64, 66, and 67 as shown in FIG. 2. Although four windows are shown, any reasonable number may be used to permit flow of air into the bore when the valve is in the open position. Each of these windows 62, 64, 66, 67 provides an opening through which air is allowed to travel from the high pressure area 16 through the axial bore 58 and into the low pressure area 17 when the poppet valve 23 is in an open position, which is whenever the flange 56 is not providing an air tight seal with the high pressure end 34 of housing 20. Since the closure member 23 is axially moveable in an essentially infinite range of adjustments between the full open and full closed position, the amount of air flowing into the bore 58 and thus to the low pressure or discharge side is directly related to the axial length of the windows which is open, i.e., that portion of the windows above high pressure end 34 of the housing 20, as seen with respect to valve 10 of FIG. 1.

Tubular side wall 54 of the closure member 23 further has diametrically opposed lower axially extending pin slots 72 and 74 through which the lower extension element, or pin, 40 is passed. The width of the lower pin slots 72 and 74 is slightly greater than the diameter of the lower pin 40 for closely receiving the lower pin 40 therethrough, the ends of which are fixed in openings 37 and 38 of the housing, and for allowing axial movement of the closure member relative to the pin 40. Since the lower pin 40 is fixed to the housing 20 by insertion into the lower pin apertures 37 and 38, rotating movement of the closure member 23 is thereby prevented by the engagement of the lower pin 40 with the side walls of lower pin slots 72 and 74. The axial length of the lower pin slots 72 and 74 is effectively the length of travel of the closure member from the fully closed to the fully open position and is related to the axial length of the windows.

Means are provided normally to bias the closure member 23 towards the closed or shut-off position shown in FIG. 3, whereby the flange 56 is sealed relatively tightly against the high pressure end 34 of housing 20. The closure biasing means includes an upper pin 76 received in diametrically opposed apertures in the closure member 23 and located above the windows and penetrating dome 52. One of these apertures 77 is shown in FIGS. 3 and 4. Spring 42 is hooked at one end to the upper pin 76, which moves axially as the closure member is moved axially, and at the other end to the lower pin 40 which is fixed and does not move axially with respect to the housing. This spring 42 provides the tension required to bias the closure member to its airtight closed position on the high pressure end 34 of housing 20.

The actuator means or control member 25, received in the bore of the housing and generally below the closure member, comprises a hollow cylindrical upper portion 27 and a lower portion 29, the latter being in air flow communication with the closure member 23 for flow of air from the air source to the discharge side when the valve is in an open position. The control member 25, in this form of the invention is in two pieces for ease of manufacture and assembly and are locked together during assembly for rotary movement together. As seen in FIG. 2, the lower end 29 of the control member, which forms an adjustment collar, includes a knurled outer peripheral portion 80 which extends beyond, i.e., vertically below the housing, see FIG. 1, and which is used to rotate the control member 25 for axial movement of the closure member.

Located in an interior bore 82 of the lower end 29 is an interior counterbore forming an annular interior shoulder 84, as shown in FIGS. 2 and 4, for example. Vertically above the knurled section 80 is an outer shoulder 85 with a vertically extending wall section 87 extending axially towards the closure member 23. Provided in the wall section 87 are a plurality of spaced circumferentially extending slots 90, three being shown and displaced 120 degrees.

The upper portion 27 of the control member 25 includes a lower wall portion 92 having an internal diameter such that it seats on the shoulder 84 of the knurled lower end 29 of the control member and forms essentially a smooth interior wall segment as illustrated in FIG. 4. To this end, the upper portion of the control member 25 is provided with a section 94 of a somewhat greater outside diameter essentially corresponding to the outside diameter of the outer diameter of the closure member below the dome section and being of a greater outside diameter as compared to the lower wall portion 92. Provided in the lower wall portion 92 are a plurality of circumferentially spaced nubbins 95, preferably in pairs, as shown in FIG. 2. Nubbins 95 are adapted and proportioned to snap fit and mate respectively with slots 90, thus securing the upper and lower parts of the control member together for rotation. It is understood that other means may be used to secure these two parts together, if desired.

The upper end of the adjustment collar 29 is provided with a vertically extending projection 98, preferably triangular shaped, which projects upward. This triangular projection 98 is adapted to fit within any of the plurality of notches 45 on the annular ring 44 for purposes of locking, although there is basically an infinite range of adjustment between the open and closed position. As the outer adjustment collar 80 is rotated about its axis, the projection 98 may or may not be temporarily placed within one of these notches 45, however, in the event of vibration or other disturbance, the projection 98 is locked into one of the adjacent slots to prevent material changes in the air flow setting.

The upper portion 27 of the control member includes a contoured end 100 which is in a plane which is inclined at the same angle as the annular cam surface 60 of the closure member 23. Contoured end 100 is adapted to act as a cam in conjunction with the contoured end 60 of the closure member 23. Contoured end 100 matches and mates with cam surface 60 when the air control valve unit lo is in its closed position, as seen in FIG. 3. Note that the cam surface 60 of the closure member 23 is inclined to match the contour of the inclined end 100 of the lower portion 27. Spring 42 biases the closure member 23 towards the housing 20 such that the same is normally closed, depending on the rotational orientation of the outer adjustment portion 29. Air flows through the windows 62, 64, 66, 67 and longitudinal bore 58, of closure member 23, through the upper portion 27 and lower portion 29 of control member 25 and then out into the low pressure area 17 in the passenger cabin.

Referring to the views illustrated in FIGS. 2 and 4, a groove 102 beneath the shoulder 94 on the upper portion 27 extends circumferentially approximately 190 degrees and cooperates with the nubbin 46 on the annular ring 44 of the housing 20. This groove 102 and nubbin 46 control the rotation of the control member 25 to approximately 180 degrees from a full opening to a fully shut position. If the groove 102 and nubbin 46 were not used, it would be possible to continuously rotate the control member 25 to provide opening and closing on a continuing rotating basis. It is preferred to provide a rotation stop so that the user is aware of the full open and full closed positions.

The valve 10 is mounted on a wall 105 of the air manifold for tilting movement in a 360 degree arc and at an angle of up to 60 degrees off the center axis. As shown in FIGS. 3 or 4, this mounting may include an annular threaded member 107, having a shoulder 109 for receiving the wall 105, the threaded member being received over the housing 20 and sealed thereto by an annular seal element 110 which prevents escape of air around the housing but which permits angular and tilting movement of the housing relative to the wall. To anchor the housing in place, a second threaded member 112 is mounted on the interior and screwed into member 107 with an annular seal element 114 therebetween.

In operation, in the closed position as seen in FIG. 3, the inclined cam surfaces 60 and 100 are in mating engagement and the valve is in the closed position, sealed by engagement between the top of the housing and diverging wall 56b of the flange 56. The effectiveness of the seal is demonstrated by the comparatively small leakage of air when tested at pressures of both five and twenty inches of water. The windows are thus effectively sealed to the flow of air. As the knurled end 80 of the control member is rotated, cam surface 100 is rotated such that the inclined faces 60 and 100 are misaligned by an amount proportional to the rotation of the knurled end 80. The misalignment takes place because the closure member is movable axially but cannot rotate. Axial movement of the closure member in response to rotation of the control member 25 causes the closure member 23 to move vertically against the spring 42 to unseat the seal between the dome and the housing permitting air to flow through those portions of the windows that are uncovered and out through the air path already described.

In the form described, the maximum rotation of the control member is approximately 180 degrees from the full closed to the full open position, as already noted. However, rotation from zero degrees to 180 degrees represents effectively an infinite adjustment in that range. While the triangular projection 98 is also rotated, the latter may or may not seat in one of the notches 45. Material changes in the setting of air flow are prevented by the projection 98 engaging one of the notches 45 in the event of accidental rotation of the control member 25.

Another form of an air control valve in accordance with this invention is shown in detail in FIGS. 5-8. That valve 200, includes the same basic elements of a generally spherical housing 220, a closure member 223, and a control member 225. As was the case with valve 10, this valve 200 is also supported in a conduit or manifold which provides an air source. Housing 220 is formed of two sections, a top half section 227 and a bottom half section 230. The top section 227 of housing 220 contains the same inside wall 231 providing a cylindrical cavity or bore 232 extending axially from a high pressure end 224 to a low pressure end 226.

Two axially extending slots 238 and 239 are provided in diametrically opposed facing locations on the inside wall 231 of the upper section 227 of housing 220. These slots 238 and 239 are greater in length axially than they are in circumferential width. These slots prevent the closure member 223 from rotating relative to the housing while permitting the closure member to travel axially within the housing 220, as will be detailed.

The housing 220 is further provided with an annular chamber 240 between the outside surface of the top section and the outer surface of the wall 231 in which a relatively large diameter coil spring 245 is positioned. The spring 245 preferably includes 3 coils with one active coil between two end coils. The spring 245 biases the closure member 223 towards its closed position, which is seen in FIG. 8.

The high pressure end 224 of housing 220 has a slightly angled shoulder 251 on which an outwardly extending flange 252 of closure member 223 rests to provide an air-tight seal. The flange end of the closure member is configured similarly to that already described. The low pressure end 226 has an inwardly projecting annular lip 262 which restricts the axial movement of control member 225, explained below.

The closure member 223 is almost identical to the closure member 23 of the first embodiment. In this form, the cap 272 is flat, as opposed to the conical cap shown in FIG. 2-4. The cap could of course be any shape. Closure member 223 is preferably molded in a self lubricating material, for example a graphite-filled compound.

The tubular side wall 276 of closure member 223 is provided with a plurality of circumferentially spaced windows 280 through which air flows with the valve in an open position. The lower end 282 of the closure member is an angled cam surface which cooperates with a cam 285, correspondingly configured, on the control member 225. The cam surface 282 and the cam 285 function as already described, i.e., to effect smooth and continuous axial movement of the closure member, as contrast to indexed movement, in response to rotation of the control member 225. When the cam and cam surface are in facing engagement, the valve is in the closed position. As the control member is rotated, there is a progressive relative displacement of the two inclined faces, the amount of the displacement controlling the amount of axial movement of the closure member and the amount of air passage through the windows.

Closure member 223 is provided with a pair of oppositely disposed pin receiving apertures 286 located in the side wall 276 above the cam surface and below the windows. These apertures are oriented to be in alignment with the spaced axially extending slots 238 and 239. Pins 294 are received in the slots 238 and 239 and in the apertures 286. As seen in FIGS. 6-8, the spring includes a lower coil which rests on the pins and an upper coil which bears against a top wall 295 in the annulus 240. The pins 294 travel axially with the closure member 223 in the slots 238 and 239, the latter also operating to prevent rotation of the closure member relative to the housing.

The control member 225 includes a bore 298 which is in fluid communication with the bore of the closure member 223. The control member is received in the bore of the housing and the former is provided with a an outwardly projecting shoulder 299 which seats on an inner shoulder 300 of the lower section 230. The lower end section 301 of the control member extends beyond the end of the lower part of the housing and supports a knurled control element 305 which is locked to the control member 225 by a friction fit or other suitable means. Thus, by rotating the knurled element, the control element is rotated to rotate the cam 285 which causes axial movement of the closure member due to the difference in angular orientation of the cam and cam surface, as seen in FIGS. 6 and 7.

Movement of the closure member 223 towards the high pressure end 224 compresses spring 245. This compression of spring 245 biases the closure member 223 back towards the closed position whereby the outwardly extending flange 252 is seated up against the angled portion 251 of housing 220. Thus, the closure member is always biased to the closed position.

As seen in FIGS. 5-8, the housing includes facing shoulders 310 and 312 on the upper and lower halves, respectively. These shoulders snap together to hold the housing as one piece after assembly to be described. Mounted on the housing is a mounting element 315 which includes a threaded portion 316 and a shoulder 318, for mounting as previously described. The mounting element also includes an inner peripheral seal 320 which seals the housing against passage of air from the manifold while permitting tilting and angular portioning as may be desired.

In this form of the invention, there is continuous rotation from an open to a closed position and the knurled end 305 of the control element 225 may be rotated in either a clockwise or counterclockwise direction.

The assembly of the unit illustrated in FIGS. 5-8 involves inserting the closure member 223 into the upper half 227 of the housing 220 with the apertures 286 aligned with the slots 238 and 239. The coil spring 245 is then inserted into the annulus 240 and the pins 294 are inserted through the slots 238 and 239 such that the bottom coil of the spring 245 are above the pins 294. The ends of the pins 294 are then positioned into the pin apertures 286. This may be a friction fit or use of an adhesive or the like. The control member 225 is then inserted through the open upper end of the lower half 230 of the housing 220 such that shoulder 299 seats on shoulder 300. The knurled end 305 is then assembled and the two subassemblies are snapped together such that the mating shoulders 310 and 312 mesh. If desired, an adhesive may be used. The mounting ring 315 is then press fitted over the housing 220 and the unit is ready for mounting in the manifold.

The invention can be used, with minor adaption in some cases as a control valve unit for virtually any type of fluid not just air.

The invention is not limited to the specific embodiments described above, but all changes and modifications thereof as are apparent to those skilled in the art and not constituting departing from the spirit and scope of the invention as claimed herein are intended to be included.

What is claimed is:

1. An air control valve unit for variably controlling the discharge of air from an air source, comprising:
   a housing having a wall defining a cavity extending axially therethrough;
   an axially moveable and nonrotating tubular closure member received for progressive axial and nonrotating movement in said cavity;
   said tubular closure member including sealing means at one end thereof for engagement with said housing to prevent flow of air therethrough and actuation means at the other end thereof for effecting axial movement thereof and further including aperture means between the sealing means and the actuation means for passage of air;
   actuator means in fluid communication with said tubular closure member and including an end extending out of said housing;
   said actuator means being axially fixed in said cavity and being rotatable with respect thereto;
   said actuator means including a cam surface normally engaging said actuation means and operative upon rotation of said actuator means to effect progressive axial movement of said tubular closure member to permit flow of an amount of air related to the location of said aperture means relative to said housing.

2. An air control valve as set forth in claim 1 wherein said housing is a two part housing.

3. An air control valve as set forth in claim 1 further including:
   means normally biasing said tubular closure member to a closed position to prevent air flow through said closure member and said actuator means.

4. An air control valve as set forth in claim 3 wherein said means normally biasing said tubular closure member to a closed position also prevents rotation thereof with respect to said housing.

5. An air control valve as set forth in claim 1 wherein said actuation means include a cam surface normally engaging said cam surface of said actuator means.

6. An air control valve as set forth in claim 1 wherein said actuator means is a two part actuator means.

7. An air control valve as set forth in claim 1 further including:
   axial movement preventing means for preventing the axial movement of said actuator means with respect to said cavity.

8. An air control valve as set forth in claim 1 further including:
   rotation preventing means for preventing rotation of the axially moveable closure member with respect to said housing.

9. An air control valve as set forth in claim 8 wherein said rotation preventing means include:
   at least one extension element fixed to said closure member and extending outwardly therefrom; and,
   receiving means on the wall of said housing for receiving said extension element therein; said receiving means adapted for allowing said extension element to slide freely along an axis parallel to the longitudinal axis of said cavity; said receiving means adapted for preventing said extension element to rotate with respect to said housing.

10. An air control valve as set forth in claim 8 wherein said rotation preventing means include:
    at least one extension element fixed to said housing and extending inwardly therefrom; and,
    receiving means on said closure member for receiving said extension element therein; said receiving means adapted for allowing said extension element to slide freely along an axis parallel to the longitudinal axis of said cavity; said receiving means adapted for preventing said extension element to rotate with respect to said housing.

11. An air control valve as set forth in claim 1 wherein said housing is generally spherically shaped and adapted to be universally pivotable.

12. An air control valve as set forth in claim 11 wherein the wall defining said cavity is cylindrical and is axially aligned with said generally spherical housing.

13. An air control valve as set forth in claim 1 wherein the wall defining said cavity is cylindrical.

14. An air control valve as set forth in claim 1 wherein said sealing means include:
    a cap portion of said closure member having an outwardly extending radial flange; and,
    the top surface of said housing having a shape that conforms to the shape of the lower surface of said flange, said top surface adapted for tightly mating with the lower surface of said flange.

15. The air control valve unit of claim 3 wherein said closure member biasing means include:
    first support means fixed to said housing and,
    second support means fixed to said closure member and,
    a flexible and resilient element having one end fixed with respect to said first support means and the other end fixed with respect to said second support means; said resilient element being in its relatively most relaxed condition when said closure member is in said closed position.

16. The air control valve unit of claim 1 further comprising temporary locking means for temporarily locking said actuator means into any of a plurality of positions.

17. The air control valve unit of claim 13 wherein said temporary locking means comprise:
- an annular ring fixed to said housing in said cavity; said annular ring having a lower edge containing a plurality of grooves; and,
- a projection fixed to said actuator means; said projection adapted to temporarily mate with each of said grooves upon alignment thereof with said projection.

18. The air control valve unit of claim 1 further comprising means for preventing said closure member from moving completely out of said cavity.

19. An air control valve unit for variably controlling the discharge of air from an air source, comprising:
- a two part housing having a wall defining a cavity extending axially therethrough; said housing being generally spherically shaped and adapted to be universally pivotable; the wall defining said cavity being cylindrical and axially aligned with said generally spherical housing;
- an axially moveable and nonrotating tubular closure member received for progressive axial and nonrotating movement in said cavity;
- said tubular closure member including sealing means at one end thereof for engagement with said housing to prevent flow of air therethrough and a cam surface at the other end thereof for effecting axial movement thereof and further including aperture means between the sealing means and the actuation means for passage of air;
- actuator means in fluid communication with said tubular closure member and including an end extending out of said housing;
- said actuator means being axially fixed in said cavity and being rotatable with respect thereto;
- said actuator means including a cam surface normally engaging said cam surface of said tubular closure member and operative upon rotation of said actuator means to effect progressive axial movement of said tubular closure member to permit flow of an amount of air related to the location of said aperture means relative to said housing;
- axial movement preventing means for preventing the axial movement of said actuator means with respect to said cavity;
- an annular chamber in said housing;
- at least one extension element fixed to said closure member and extending outwardly therefrom into said chamber;
- receiving means on the wall of said housing for receiving said extension element therethrough; said receiving means adapted for allowing said extension element to slide freely along an axis parallel to the longitudinal axis of said cavity; said receiving means contacting said extension element preventing the axially moveable closure member from being rotated about the axis of said cavity;
- a flexible and resilient element having one end fixed with respect to said extension element and the other end fixed with respect to said chamber; said resilient element being in its relatively most relaxed condition when said closure member is in said closed position, whereby the resiliency of said flexible and resilient element normally biases said tubular closure member to a closed position to prevent air flow through said closure member and said actuator means.

20. An air control valve unit for variably controlling the discharge of air from an air source, comprising:
- a housing having a wall defining a cavity extending axially therethrough; said housing being generally spherically shaped and adapted to be universally pivotable; the wall defining said cavity being cylindrical and axially aligned with said generally spherical housing;
- an axially moveable and nonrotating tubular closure member received for progressive axial and nonrotating movement in said cavity;
- said tubular closure member including sealing means at one end thereof for engagement with said housing to prevent flow of air therethrough and a cam surface at the other end thereof for effecting axial movement thereof and further including aperture means between the sealing means and the actuation means for passage of air;
- a two part actuator means in fluid communication with said tubular closure member and including an end extending out of said housing;
- said actuator means being axially fixed in said cavity and being rotatable with respect thereto;
- said actuator means including a cam surface normally engaging said cam surface of said tubular closure member and operative upon rotation of said actuator means to effect progressive axial movement of said tubular closure member to permit flow of an amount of air related to the location of said aperture means relative to said housing;
- axial movement preventing means for preventing the axial movement of said actuator means with respect to said cavity;
- at least one extension element fixed to said housing and extending inwardly therefrom; and,
- receiving means on said closure member for receiving said extension element therethrough; said receiving means adapted to allow said closure member to slide freely along an axis parallel to the longitudinal axis of said cavity; said receiving means adapted for preventing said closure member to rotate with respect to said housing;
- a flexible and resilient element having one end fixed with respect to said extension element and the other end fixed with respect to said closure member; said resilient element being in its relatively most relaxed condition when said closure member is in said closed position, whereby the resiliency of said flexible and resilient element normally biases said tubular closure member to a closed position to prevent air flow through said closure member and said actuator means.

* * * * *